United States Patent Office 3,584,011
Patented June 8, 1971

3,584,011
PRODUCTION OF ε-CAPROLACTONE
Francis Weiss, Pierre-Benite, Jean Pierre Schirmann, Brignais, and Andre Lantz, Oullins, France, assignors to Ugine Kuhlmann, Paris, France
No Drawing. Filed Oct. 17, 1967, Ser. No. 675,780
Claims priority, application France, Oct. 25, 1966, 81,449
Int. Cl. C07d 7/06
U.S. Cl. 260—343      10 Claims

ABSTRACT OF THE DISCLOSURE

ε-Caprolactone which is produced in a formic acid-containing reaction medium is stabilized by the addition of a stabilizing agent thereto. Compounds which function as stabilizing agents according to the method of this invention comprise salts of formic acid or, in the alternative, compounds which react with formic acid to produce in situ a formate of formic acid. The stabilizing agent may be added to the formic acid-containing reaction medium either during the process of production of ε-caprolactone or to the already-formed ε-caprolactone present in the formic acid environment after it has been produced therein.

BACKGROUND OF THE INVENTION

(I) Field of the invention

This invention relates to a method for stabilizing ε-caprolactone in a formic acid-containing reaction medium. In particular, it relates to the addition of salts of formic acid or of compounds which will react with formic acid to produce formates of formic acid in situ in formic acid environments in which ε-caprolactone is produced.

(II) Description of the prior art

ε-Caprolactone can be produced by the oxidation of cyclohexanone in solutions of formic acid by means of hydrogen peroxide as disclosed in French Pat. No. 1,385,557 or by the rearrangement of peroxides of cyclohexanone within the formic acid-containing reaction medium as disclosed in French Pat. No. 1,407,154, both of which French patents have been issued to the applicants herein.

The instability of ε-caprolactone in highly acid environments creates a strong tendency for the ε-caprolactone to react with formic acid to either form ε-formyloxycaproic acid or, alternatively, to be transformed into polyesters of ε-caprolactone. Due to this tendency of ε-caprolactone to react with the formic acid there is great difficulty in obtaining satisfactory yields of ε-caprolactone. The amount of yield of ε-caprolactone in any particular case is governed by such factors as temperature and dwell periods of reaction, both of which must be carefully controlled during the reaction. The instability of the ε-caprolactone also makes its separation from the reaction mixture and its collection after it has been produced extremely difficult.

The instability of ε-caprolactone can readily be seen by a consideration of the following typical example wherein a mixture initially containing 1 mol of caprolactone, 5.55 mols of formic acid and 2 mols water results in the conversion in 30 minutes at 40° C. of 52% of the caprolactone initially present into ε-formyloxycaproic acid. To obtain a maximum yield of ε-caprolactone, under such unstable conditions, it is necessary in the practice of this reaction to maintain the temperature of the reaction medium, both during the reaction as well as during the subsequent separation procedures, at less than 40° C. Where higher temperatures are required, as, for example, where separation is to be carried out by fractional distillation, it is necessary to perform the reaction very rapidly. As a result, utilization of this procedure for producing ε-caprolactone is quite inefficient and relatively costly in addition to which a large part of the ε-caprolactone which is produced is subsequently converted by acidolysis or by polymerization, thus further reducing its ultimate yield.

SUMMARY OF THE INVENTION

The present invention is based on the discovered that the speed of conversion of ε-caprolactone by acidolysis or polymerization in a reaction medium containing formic acid was slowed down considerably where the reaction medium contained small quantities of a salt of formic acid. Due to the slowing action caused by the presence of a formate, greater latitude is available in choosing the reaction operating conditions for the production of ε-caprolactone. This both simplifies the formic acid production process of ε-caprolactone and improves the overall yield of ε-caprolactone in the process. Broadly stated, this invention comprises a process for the stabilization of ε-caprolactone in a formic acid-containing reaction medium (or environment) which comprises adding to the formic acid environment a stabilizing agent which comprises either a salt of formic acid or a compound which reacts with formic acid to produce in situ a formate of formic acid.

Reaction media which are most commonly treated according to the method of this invention are those, in particular, which are related to the production of ε-caprolactone from cyclohexanone as, for example, according to the processes described in the applicants' French Pats. Nos. 1,385,557 and 1,407,154. The addition of a stabilizing agent, either preformed or formed in situ, may be made either during the course of evolution of ε-caprolactone during oxidation of cyclohexanone or after the ε-caprolactone has been formed to allow easier separation of the caprolactone by fractional distillation.

The presence of the stabilizing formate does not disturb the reaction of performic acid with cyclohexanone in the production of ε-caprolactone. The stabilizing agent acts to both decelerate the formation of further quantities of performic acid from the as yet unconverted hydrogen peroxide and to decelerate the rearrangement of the peroxides of cyclohexanone into caprolactone. The addition of the stabilizing agent during oxidation should be carefully made, taking these deceleration factors into account. Thus, the stabilizers may be added at the start of the oxidation if the greater portion of hydrogen peroxide has previously been converted into performic acid. Where this is not the case, they may be added during oxidation, at a time chosen in such a manner that the conversion of hydrogen peroxide had progressed sufficiently for the rate of addition of this reactant to be economically efficient. In a continuous reaction, where the reaction vessels or reactors are arranged in series, the addition of the stabilizing agent may be made in the first, second or *n*th reactor, or, alternatively, at the outlet of the oxidation reactors.

DESCRIPTION OF THE PREFERRED PRACTICE OF THE INVENTION

Compounds which have been found to be effective as stabilizing agents are the formates of alkaline and alkaline earth metals as well as the formates of magnesium, zinc and aluminum. These compounds may be added either in solution in water or formic acid or in the form of a compound of one of the foregoing metals which is able to react with a part of the formic acid of the environment to yield the corresponding formate in situ. The latter compounds which are able to be formed in situ may be chosen from the oxides, hydroxides, alcoholates and salts of inorganic or organic acids which are weaker than formic acid, as, for example, the carbonates, bicarbonates and acetates of these compounds.

The formates of ammonium may likewise be employed in the method of this invention through their addition to the reaction medium as a preformed product. These ammonium compounds are, however, more easily formed in situ by the direct addition of an appropriate quantity of ammonia or of an amine either by direct addition or through their addition in solution. Compounds such as the primary, secondary or tertiary amines or oxides of aliphatic or cyclo-aliphatic tertiary amines, having from 1 to approximately 15 carbon atoms, may be added to the reaction medium if stabilization is to be effected after the production of ε-caprolactone has occurred. In contrast, if it is desired to insure stability during the oxidation reaction in which the ε-caprolactone is formed, the fact that certain amines are able to react with the peroxide compounds in the solution must be taken into account. In such a case it is preferable to limit the choice of a stabilizing agent to those tertiary amines which are not easily oxidized or to the oxides of amines which are stable in the presence of peroxide compounds.

It has been found that very small quantities of formate are sufficient to reduce the speed of conversion of ε-caprolactone to a small fraction of what it would be in the same environment in the absence of the stabilizing compounds. The quantity of stabilizing agent to be added may be determined in such a manner that the ratio between the concentration of formate ions of the stabilizing agent and the concentration of the free formic acid ($HCOO^-/HCOOH$) contained in the formic acid reaction environment amounts to between 0.001 and 0.5 and, preferably, to between 0.005 and 0.1.

The following non-limiting examples illustrate the method of stabilizing ε-caprolactone in formic acid environments according to the process of this invention.

Examples 1 to 3

The following examples illustrate the degree of conversion of ε-caprolactone to ε-formyloxycaproic acid at 40° C. in a mixture having the following initial composition and to which various quantities of anhydrous sodium formate were added:

INITIAL COMPOSITION

| | Percent by weight |
|---|---|
| ε-Caprolactone (14.3 mol percent) | 31.5 |
| Formic acid (71.5 mol percent) | 63.5 |
| Water (14.3 mol percent) | 5.0 |

Example 1

A first test was performed in which:
0.02 mol of sodium formate were added per mol of formic acid (1.87 g. sodium formate to 100 g. of the initial mixture). It was observed that after one and a half hours at 40° C., 81% of the initial ε-caprolactone remained intact, 19% having been converted, mainly into ε-formyloxycaproic acid.

Example 2

A second test was performed under conditions similar to Example 1, but in which 0.05 mol of sodium formate had been added per mol of formic acid (4.7 g. sodium formate to 100 g. of the initial mixture). 77% of the ε-caprolactone was found to be intact after one and a half hours.

Example 3

A third test was performed under the same conditions as in Examples 1 and 2 but in which 0.2 mol of sodium formate had been added per mol of formic acid (18.7 g. sodium formate to 100 g. of the initial mixture). 82% of the ε-caprolactone remained intact after one and a half hours.

By way of comparison, the rate of conversion of ε-caprolactone in this initial mixture reached 44% at the end of one and a half hours in the absence of sodium formate, leaving no more than 56% of ε-caprolactone intact.

Example 4

The influence of the addition of anhydrous sodium formate was studied in respect of another mixture, richer in water, whose initial composition was:

| | Percent by weight |
|---|---|
| ε-Caprolactone (11.7 mol percent) | 28.1 |
| Formic acid (65 mol percent) | 63.0 |
| Water (23.4 mol percent) | 8.9 |

By adding to this mixture 0.02 mol of sodium formate per mol of formic acid (1.86 g. of sodium formate to 100 g. of mixture), the conversion of ε-caprolactone was limited to 11% in one and a half hours at 40° C.; 89% of the ε-caprolactone remained intact.

Under the same operating conditions, but in the absence of sodium formate, 70% of the ε-caprolactone was converted.

Examples 5 to 7

The same mixture as in Example 4 was employed, to which added a 40% aqueous solution of sodium hydroxide to form sodium formate in situ, by the partial neutralization of formic acid. The mixture was then heated for an hour and a half at 40° C. and the quantity of ε-caprolactone intact at that time was determined. The following results were noted:

| | Sodium hydroxide added (mol NaOH per mol of HCOOH) | Grams of 40% solution per 100 g. of mixture | Percent of intact ε-caprolactone |
|---|---|---|---|
| (Control) | 0 | 0 | 30 |
| Test: | | | |
| 5 | 0.002 | 0.274 | 65 |
| 6 | 0.01 | 1.37 | 74 |
| 7 | 0.1 | 13.7 | 88 |

Examples 8 to 13

The stabilizing influence of triethyl amine was studied by adding this reactant to mixtures of ε-caprolactone, formic acid and water having the same composition as the initial mixture employed in Examples 1 to 3. The quantities of ε-caprolactone remaining intact at the end of one and a half hours of heating at 40° C., after addition of varying quantities of triethyl amine, were as follows:

| | Triethyl amine added | | Percent of intact ε-caprolactone |
|---|---|---|---|
| | Mol per mol HCOOH | Grams/100 g. of mixture | |
| (Control) | 0 | 0 | 56 |
| Test: | | | |
| 8 | 0.001 | 0.138 | 73 |
| 9 | 0.003 | 0.415 | 79 |
| 10 | 0.012 | 1.65 | 87 |
| 11 | 0.08 | 11.0 | 92 |
| 12 | 0.17 | 23.5 | 97.8 |
| 13 | 0.33 | 45.5 | 98 |

While the invention has been described hereinabove in terms of a number of examples of the process thereof, the invention itself is not limited thereto, but rather comprehends all modifications of and departures from those examples properly falling within the spirit and scope of the appended claims.

We claim:

1. In processes for producing ε-caprolactone which comprises reacting cyclohexanone with formic acid and hydrogen peroxide or reacting a peroxide of cyclohexanone with formic acid and in which such reaction mediums contain formic acid, the improvement which comprises conducting the aforementioned reactions to produce ε-caprolactone in the presence of a stabilizing agent for ε-caprolactone consisting essentially of a salt of formic acid.

2. Processes according to claim 1 in which the salt of formic acid is present in the formic acid-containing reaction medium during the production of ε-caprolactone therein.

3. Process according to claim 1 in which the formic acid salt is an alkaline metal, alkaline earth metal, magnesium, zinc, aluminum or ammonium salt of formic acid.

4. Processes according to claim 1 in which the formic acid salt is ammonium formate.

5. Process according to claim 1 in which the metal salt of formic acid is formed in situ by reaction between the formic acid contained in the reaction medium with one of the aforesaid metals in the form of its oxide, hydroxide, alcoholate, carbonate, bicarbonate or acetate.

6. Processes according to claim 1 in which the ammonium salt of formic acid is formed in situ by reaction between the formic acid contained in the reaction medium with ammonia, a primary, secondary or tertiary amine, an oxide of an aliphatic tertiary amine having 1 to 15 carbon atoms or an oxide of a cycloaliphatic tertiary amine having 3 to 15 carbon atoms.

7. Processes according to claim 2 in which the salt of formic acid is a tertiary amine which is not readily oxidizable or an amine oxide which is stable in the presence of the peroxide compounds present in the reaction medium.

8. Processes according to claim 1 in which the salt of formic acid is present in an amount such that the ratio between the concentration of formate ion of the salt and the concentration of free formic acid in the formic acid-containing reaction medium is in the range of 0.001 to 0.5.

9. A process of stabilizing ε-caprolactone contained in a formic acid medium which comprises adding thereto a salt of formic acid in sufficient amount to stabilize the ε-caprolactone.

10. A composition of matter comprising ε-caprolactone, formic acid and a stabilizing agent for the ε-caprolactone comprising a salt of formic acid.

References Cited

UNITED STATES PATENTS 3,428,656   2/1969   Weiss _____ 260—343

JOHN M. FORD, Primary Examiner